US011969868B2

(12) United States Patent
Machida

(10) Patent No.: US 11,969,868 B2
(45) Date of Patent: Apr. 30, 2024

(54) POWER TOOL HAVING HAMMER MECHANISM

(71) Applicant: MAKITA CORPORATION, Anjo (JP)

(72) Inventor: Yoshitaka Machida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 186 days.

(21) Appl. No.: 17/667,913

(22) Filed: Feb. 9, 2022

(65) Prior Publication Data

US 2022/0266434 A1 Aug. 25, 2022

(30) Foreign Application Priority Data

Feb. 22, 2021 (JP) ................................. 2021-025938

(51) Int. Cl.
*B25D 17/04* (2006.01)
*B25D 16/00* (2006.01)

(52) U.S. Cl.
CPC ........... *B25D 17/043* (2013.01); *B25D 16/00* (2013.01); *B25D 2250/121* (2013.01)

(58) Field of Classification Search
CPC ................. B25D 17/043; B25D 17/24; B25D 2211/003; B25D 2211/061; B25D 2222/57; B25D 2250/121; B25D 2250/321; B25F 5/006
USPC ...................................................... 173/162.2
See application file for complete search history.

(56) References Cited

U.S. PATENT DOCUMENTS

| | | | | |
|---|---|---|---|---|
| 5,522,466 | A * | 6/1996 | Harada | B25D 17/043 173/162.2 |
| 9,505,118 | B2 * | 11/2016 | Furusawa | B25D 17/24 |
| 2010/0206596 | A1 * | 8/2010 | Kamegai | B25F 5/026 16/431 |
| 2012/0160533 | A1 * | 6/2012 | Kamegai | B25D 17/20 173/162.2 |
| 2014/0352994 | A1 * | 12/2014 | Yoshikane | B25D 17/043 173/162.2 |
| 2019/0061132 | A1 * | 2/2019 | Mori | B23D 51/16 |

FOREIGN PATENT DOCUMENTS

JP 2011-000684 A 1/2011

* cited by examiner

*Primary Examiner* — Jacob A Smith
(74) *Attorney, Agent, or Firm* — Oliff PLC

(57) ABSTRACT

A power tool having a hammer mechanism comprises a tool body, a motor, a handle, at least one biasing member, and at least one elastic member. The handle is connected to the tool body to be movable in at least a front-rear direction. The handle includes a cover part covering a portion of the tool body, and a grip part connected to the cover part. The at least one biasing member is disposed between the tool body and the handle and biases the tool body and the handle away from each other in the front-rear direction. The at least one elastic member is disposed between the tool body and the cover part of the handle such that the at least one elastic member is movable relative to the tool body and the handle and is shear-deformable in response to a relative movement of the tool body and the handle.

20 Claims, 9 Drawing Sheets

POWER TOOL HAVING HAMMER MECHANISM

CROSS-REFERENCE TO RELATED APPLICATION

The present application claims priority to Japanese patent application No. 2021-025938 filed on Feb. 22, 2021, the contents of which are hereby fully incorporated herein by reference.

TECHNICAL FIELD

The present disclosure relates to a power tool having a hammer mechanism that is configured to linearly drive a tool accessory.

BACKGROUND

A power tool having a hammer mechanism, which is configured to linearly drive a tool accessory along a driving axis to perform an operation on a workpiece, generates significant vibration especially in an extension direction of the driving axis. In order to cope with the vibration, various vibration-isolating housings are known. For example, a power tool (a rotary hammer) disclosed in Japanese laid-open patent publication No. 2011-000684 includes a handle having a grip part and a body that houses a motor and a driving mechanism. The handle and the body are elastically connected to each other via rubbers for isolating vibration.

SUMMARY

In the above-described power tool, owing to shear deformation of the rubbers, the vibration in the extension direction of the driving axis to be transmitted from the body to the handle can be effectively reduced. However, there is still room for further improvement in reducing vibration transmission to the handle.

Accordingly, it is a non-limiting object of the present disclosure to provide improvement for reducing vibration transmission to a handle in a power tool having a hammer mechanism.

One aspect of the present disclosure provides a power tool having a hammer mechanism, which is configured to linearly drive a tool accessory along a driving axis that defines a front-rear direction of the power tool. The power tool includes a tool body, a motor, a handle, at least one biasing member, and at least one elastic member.

The tool body extends along the driving axis. The motor is housed in the tool body. The handle is connected to the tool body to be movable in at least the front-rear direction. The handle includes a cover part and a grip part. The cover part covers a portion of the tool body. The grip part is connected to the cover part and extends in a direction that intersects the driving axis. The at least one biasing member is disposed (interposed) between the tool body and the handle. The at least one biasing member is configured to bias the tool body and the handle away from (to be separated from) each other in the front-rear direction. The at least one elastic member is disposed (interposed) between the tool body and the cover part of the handle. The at least one elastic member is movable relative to the tool body and the handle. The at least one elastic member is shear-deformable in response to relative movement of the tool body and the handle. The term "shear-deformable" herein refers to not only a case in which the at least one elastic member is capable of undergoing shear deformation only, but also a case in which the at least one elastic member is capable of undergoing shear deformation while undergoing compressive deformation (compression deformation).

According to the above-described configuration, the handle can move in the front-rear direction (i.e. an extension direction of the driving axis) relative to the tool body in response to vibration that is generated when the tool accessory is driven, and the at least one biasing member can absorb the vibration in the front-rear direction. Therefore, vibration transmission from the tool body to the handle can be reduced. Further, the at least one elastic member can also reduce the vibration transmission to the handle by shear deformation. Further, the at least one elastic member is movable in the front-rear direction relative to the tool body and the handle. Therefore, the at least one elastic member can smoothly guide the relative movement of the tool body and the handle.

DESCRIPTION OF EMBODIMENTS

Figure 1:
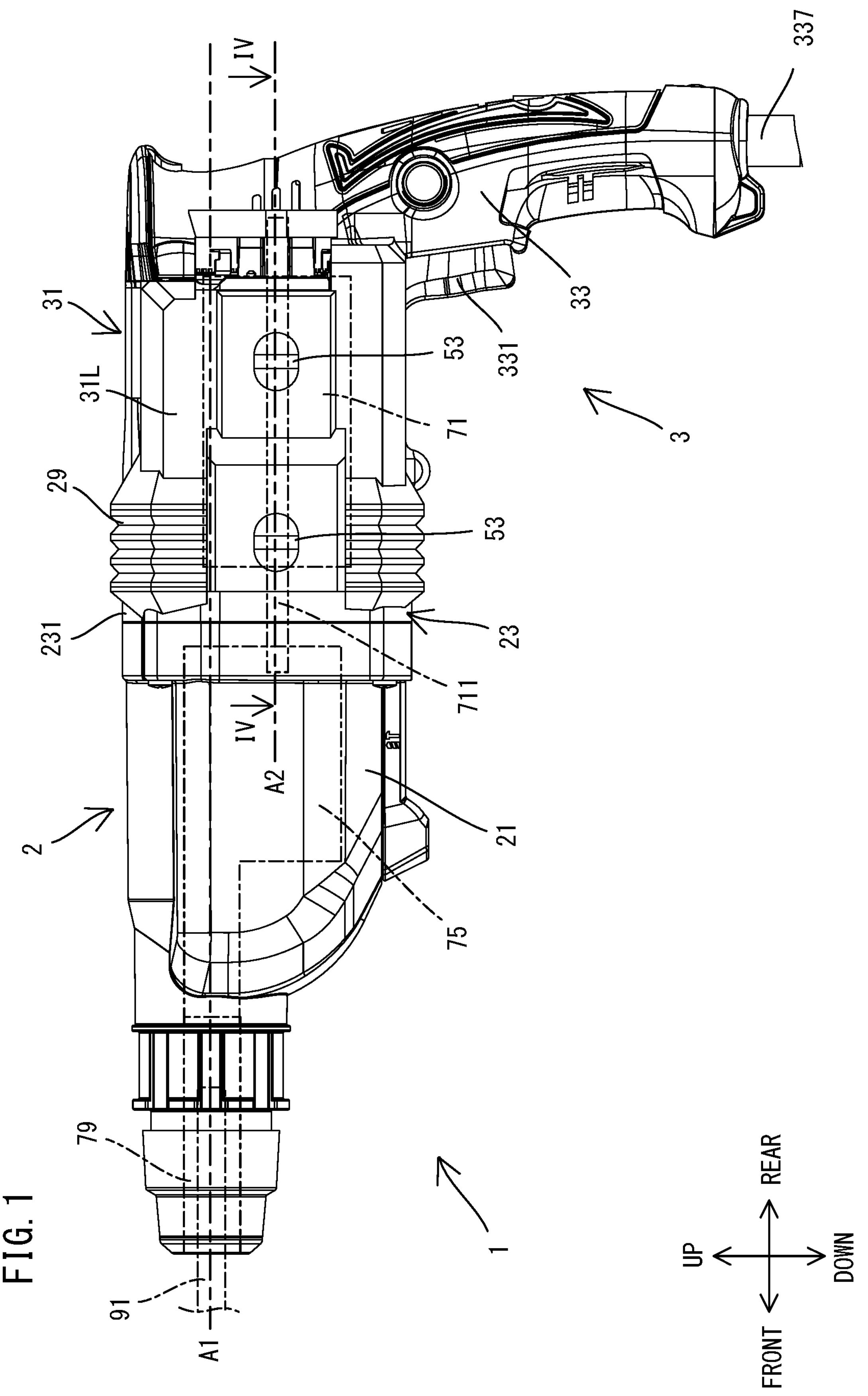
FIG. 1 is a left side view of a rotary hammer in a state in which a handle is at (in) an initial position.

In one non-limiting embodiment according to the present disclosure, the at least one elastic member may be configured to move in the front-rear direction relative to the tool body and the handle without substantially undergoing shear deformation while the handle moves in the front-rear direction relative to the tool body within a specified range. Further, the at least one elastic member may be configured to undergo shear deformation when the handle moves relative to the tool body beyond the specified range. According to this configuration, in addition to the at least one biasing member, the at least one elastic member can achieve an effect of reducing the vibration by the shear deformation thereof when the handle moves relative to the tool body beyond the specified range. Consequently, the vibration transmission can be effectively reduced in accordance with the magnitude of the vibration in the front-rear direction.

In addition or in the alternative to the preceding embodiment, the at least one elastic member may have a spherical shape. According to this configuration, the elastic member that is less likely to be damaged even when a force in a shear direction is applied to the at least one elastic member.

In addition or in the alternative to the preceding embodiments, the at least one elastic member may be rollable in the front-rear direction relative to the tool body and the handle. This configuration can especially smoothly guide the relative movement of the tool body and the handle in the front-rear direction. Thus, wear resistance of the elastic member can be improved.

In addition or in the alternative to the preceding embodiments, the at least one elastic member may be shear-deformable in response to relative movement of the tool body and the handle in an up-down direction that is orthogonal to the front-rear direction and that generally corresponds to an extension direction of the grip part. This configuration can effectively reduce transmission of the vibration not only in the front-rear direction but also in the up-down direction.

In addition or in the alternative to the preceding embodiments, the at least one elastic member may include two elastic members that are arranged in symmetry relative to a plane that contains the driving axis and that extends in the extension direction of the grip part. According to this configuration, the relative movement of the tool body and the handle in the front-rear direction can be guided more stably, and also a vibration-isolating effect can be enhanced.

In addition or in the alternative to the preceding embodiments, the at least one elastic member may include at least one front elastic member and at least one rear elastic member. The at least one rear elastic member may be arranged closer to the grip part than the at least one front elastic member. According to this configuration, the at least one front elastic member and the at least one rear elastic member can stably guide the relative movement of the tool body and the handle in the front-rear direction, at different positions in the front-rear direction.

In addition or in the alternative to the preceding embodiments, elastic deformation property of the at least one front elastic member may be different from elastic deformation property of the at least one rear elastic member. The elastic deformation property here may be rephrased as elastic deformability, or ease/tendency of elastic deformation. According to this configuration, by appropriately setting the elastic deformation properties of the elastic members, either of (i) the at least one front elastic member and (ii) the at least one rear elastic member can be utilized as a fulcrum (pivot) of relative pivot movement of the tool body and the handle.

In addition or in the alternative to the preceding embodiments, the at least one front elastic member may be configured to be less deformable than the at least one rear elastic member. According to this configuration, the at least one front elastic member, which is located farther from the grip part, can be utilized as the fulcrum of the relative pivoting movement of the tool body and the handle. Therefore, transmission of the vibration in a direction of the relative pivoting movement can be effectively reduced.

In addition or in the alternative to the preceding embodiments, the at least one biasing member may include two biasing members that are disposed on (along) a plane containing an axis of an output shaft of the motor and that are arranged in symmetry relative to the axis of the output shaft. According to this configuration, the tool body and the handle can move relative to each other in the front-rear direction more stably, compared to a configuration including only one biasing member.

Embodiment

A rotary hammer 1 according to a representative, non-limiting embodiment of the present disclosure is now described in detail with reference to FIGS. 1 to 9. The rotary hammer 1 is an example of an electric tool that is configured to linearly drive the tool accessory 91 by hammering (striking) the tool accessory 91 (i.e., a power tool having a hammer mechanism). More specifically, the rotary hammer 1 is a power tool that is configured to linearly drive the tool accessory 91 along a driving axis A1 (this operation is hereinafter referred to as a hammering operation) and to rotationally drive the tool accessory 91 around the driving axis A1 (this operation is hereinafter referred to as a rotary operation).

As shown in FIG. 1, an outer shell of the rotary hammer 1 is mainly formed by a tool body 2 and a handle 3 that is elastically connected to the tool body 2.

The tool body 2 is a hollow body that houses major mechanisms of the rotary hammer 1. The tool body 2 may also be referred to as a body housing, an outer housing, etc. The tool body 2 extends along the driving axis A1 of the tool accessory 91. A tool holder 79 is disposed in one end portion (a first end portion) of the tool body 2 in an extension direction of the driving axis A1 (hereinafter simply referred to as a driving-axis direction). The tool accessory 91 is removably held by the tool holder 79. The tool body 2 mainly houses a motor 71 and a driving mechanism 75 that is configured to drive the tool accessory 91 held by the tool holder 79 using power of the motor 71. In this embodiment, the motor 71 is arranged such that a rotational axis A2 of a motor shaft 711, which rotates integrally with a rotor, extends in parallel to the driving axis A1.

The handle 3 is formed separately from the tool body 2 and connected to the tool body 2 such that the handle 3 is movable relative to the tool body 2 in at least the driving-axis direction. The handle 3 has a grip part 33 to be gripped by a user. The grip part 33 protrudes from the other end portion (a second end portion) of the tool body 2 in the driving-axis direction (i.e., an end portion opposite to the first one end portion in which the tool holder 79 is disposed), and extends in a direction that intersects the driving axis A1 (specifically, a direction that is substantially orthogonal to the driving axis A1 and the rotational axis A2). A distal end (protruding end) of the grip part 33 is a free end. The grip part 33 has a trigger 331 to be manually depressed (pulled) by the user. In the rotary hammer 1, when the motor 71 is energized in response to the depressed manipulation of the trigger 331, the driving mechanism 75 is driven for the hammering operation and/or the rotary operation.

The detailed structure of the rotary hammer 1 is now described. For the sake of convenience, in the following description, the extension direction of the driving axis A1 (the longitudinal direction of the tool body 2) is defined as a front-rear direction of the rotary hammer 1. In the front-rear direction, the side on which the tool holder 79 is disposed is defined as a front side of the rotary hammer 1, while the opposite side (the side on which the grip part 33 is located) is defined as a rear side of the rotary hammer 1. A direction that is orthogonal to the driving axis A1 and that generally corresponds to the extension direction of the grip part 33 (a direction that is orthogonal to the driving axis A1 and the rotational axis A2) is defined as an up-down direction of the rotary hammer 1. In the up-down direction, the side on which the grip part 33 is connected to the tool body 2 is defined as an upper side of the rotary hammer 1, while a side on which the free end of the grip part 33 is located is defined as a lower side of the rotary hammer 1. A direction that is orthogonal to both of the front-rear direction and the up-down direction is defined as a left-right direction of the rotary hammer 1.

First, the structures of the tool body 2 and elements (components) disposed within the tool body 2 are described.

The tool body 2 includes a driving-mechanism housing part 21 and a motor housing part 23.

As shown in FIG. 1, the driving-mechanism housing part 21 is a hollow body that houses the driving mechanism 75. The driving-mechanism housing part 21 forms a front half of the tool body 2. A front portion of the driving-mechanism housing part 21 has a cylindrical shape. The tool holder 79 is disposed within this cylindrical portion. The remaining portion of the driving-mechanism housing part 21 other than its front portion has a generally rectangular tubular shape. The driving mechanism 75 includes a motion converting mechanism and a hammering (striking) mechanism for the hammering operation, and a rotation transmitting mechanism for the rotary operation. The driving mechanism 75 is only briefly described here since the driving mechanism 75 is well-known. The motion converting mechanism typically includes an oscillating member (for example, a swash bearing, a wobble plate/bearing, etc.), or a crank mechanism, and a piston, to convert rotation into linear motion. The rotation transmitting mechanism typically includes a speed reducing mechanism having a train of gears.

In this embodiment, the rotary hammer 1 has three action modes of: (i) a hammer mode (hammering only mode), in which the rotary hammer 1 performs only the hammering operation; (ii) a rotary mode (rotation only mode), in which the rotary hammer 1 performs only the rotary operation; and (iii) a rotary hammer mode (hammering with rotation mode), in which the rotary hammer 1 performs the hammering operation and the rotary operation at the same time. Although not shown or described in detail, the driving mechanism 75 is driven in accordance with the action mode selected by the user via a mode changing knob.

Figure 3:
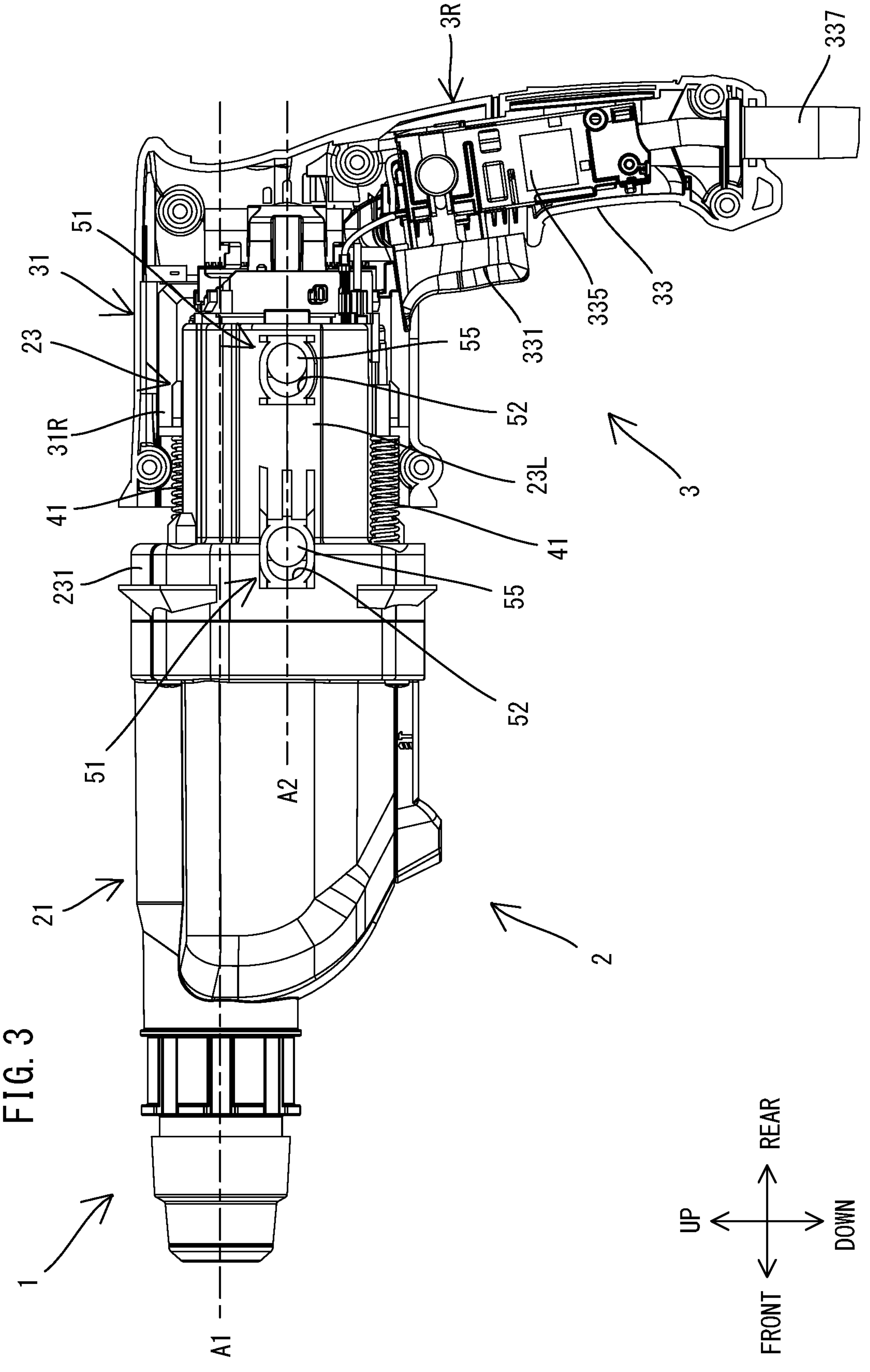
FIG. 3 is a left side view of the rotary hammer in a state in which a left member of the handle is removed and the handle is at the initial position.
Figure 4:
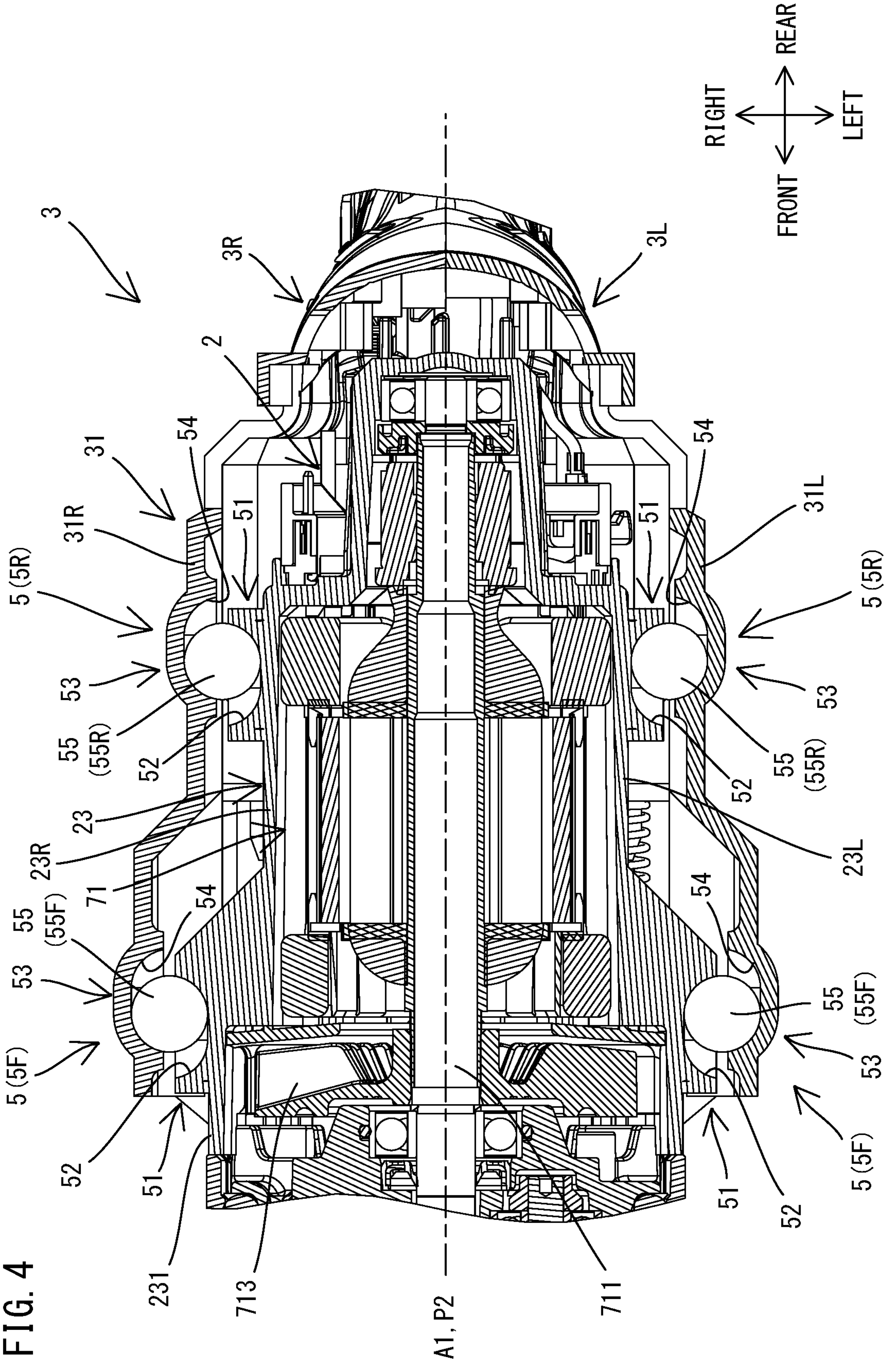
FIG. 4 is a sectional view taken along line IV-IV in FIG. 1.

As shown in FIGS. 1, 3 and 4, the motor housing part 23 is a hollow body that houses the motor 71. The motor housing part 23 has a tubular shape with a closed rear end. In this embodiment, the motor housing part 23 is a single member (without seams) that is formed separately (discretely) from the driving-mechanism housing part 21. The motor housing part 23 is fixedly connected to a rear end of the driving-mechanism housing part 21 using screws (not shown). The motor housing part 23 forms a rear half of the tool body 2.

In this embodiment, the motor 71 is an AC motor that includes a stator, the rotor, the motor shaft 711 and a commutator. The motor shaft 71 extends in the front-rear direction. A portion of the motor shaft 711 extends forward of the stator. A fan 713 is fixed to this portion of the motor shaft 71. The fan 713 is disposed within a front portion 231 of the motor housing part 23. The front portion 231 of the motor housing part 23 protrudes outward in a radial direction of the stator from the most part of a portion extending rearward of the front portion 231 (i.e., a portion that houses the stator etc.).

In this embodiment, the motor housing part 23 of the tool body 2 has two first spring receiving parts (spring seats) 25 (see FIG. 5) and four first ball holding parts 51 (see FIG. 4), which serve as a structure for elastically connecting the tool body 2 and the handle 3. The structure for elastically connecting the tool body 2 and the handle 3 will be described in detail later.

The structures of the handle 3 and elements (components) disposed within the handle 3 are now described.

Figure 2:
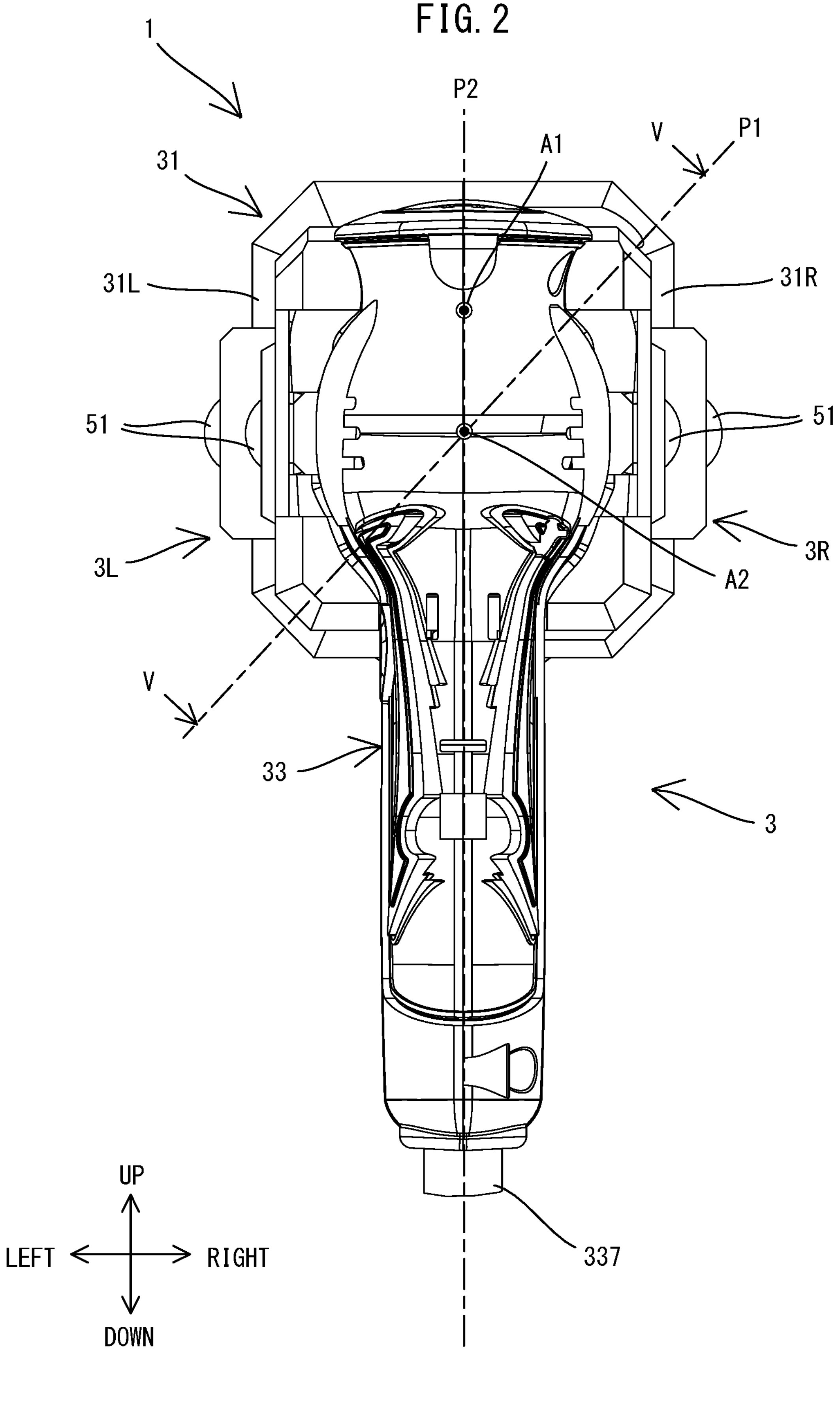
FIG. 2 is a rear view of the rotary hammer.

As shown in FIGS. 2 to 4, in this embodiment, the handle 3 is formed by a left member (a left shell or a left handle part) 3L and a right member (a right shell or a right handle part) 3R that are fixedly connected to each other in the left-right direction, using screws (not shown) fixed at multiple positions. The handle 3 includes a cover part 31 and the grip part 33.

As shown in FIGS. 1 to 4, the cover part 31 basically has a tubular shape with a closed rear end. The cover part 31 covers a rear portion of the tool body 2 (specifically, the most part of the motor housing part 23). The cover part 31 includes a left wall part 31L, a right wall part 31R, an upper wall part, a lower wall part and a rear wall part that are respectively arranged leftward of, rightward of, above, below and rearward of the motor housing part 23. A central portion in the up-down direction of each of the left wall part 31L and the right wall part 31R protrudes forward of the remaining portions of each of the left wall part 31L and the right wall part 31R. A portion of the rear portion of the tool body 2 is not covered by the cover part 31. A bellows part 29 covers this portion. The bellows part 29 is configured to extend/contract in the front-rear direction in response to relative movement of the tool body 2 and the handle 3.

In this embodiment, the cover part 31 has two second spring receiving parts (spring seats) 35 (see FIG. 5) and four second ball holding parts 53 (see FIG. 4), which serve as a structure for elastically connecting the tool body 2 and the handle 3. The second spring receiving parts 35 are connected to the first spring receiving parts 25 via biasing members 41, respectively. The second ball holding parts 53 are connected to the first ball holding parts 51 via spherical (ball-like) elastic members 55, respectively. The structure for connecting the tool body 2 and the handle 3 will be described in detail later.

As shown in FIG. 3, the grip part 33 has an elongate tubular shape. The grip part 33 extends downward from the cover part 31 in a cantilever manner. Thus, the grip part 33 extends in the up-down direction below a lower end of the tool body 2. The trigger 331 is disposed on an upper portion of the grip part 33. A switch 335 is disposed behind the trigger 331 within the grip part 33. The switch 335 is normally kept OFF and is turned ON in response to depressing manipulation of the trigger 331. When the switch 335 is turned ON, the motor 71 is energized. A power cord 337, which is connectable to an external AC power source, extends from a lower end of the grip part 33 (the free end or the protruding end of the handle 3).

The details of the structure for connecting the tool body 2 and the handle 3 are now described.

First, the details of the structure for connecting the first spring receiving parts 25 and the second spring receiving parts 35 are described.

Figure 5:
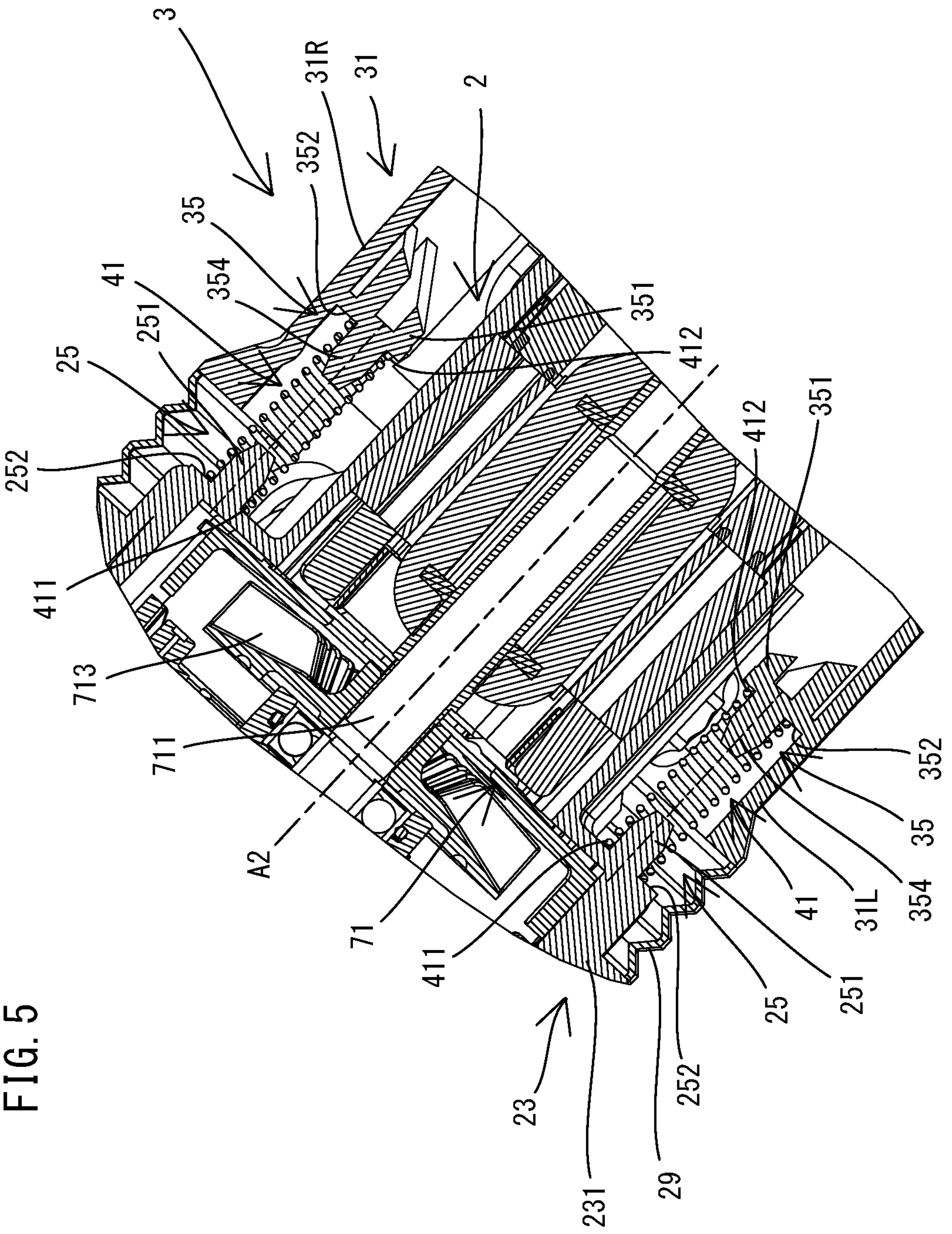
FIG. 5 is a sectional view taken along line V-V in FIG. 2.
Figure 6:
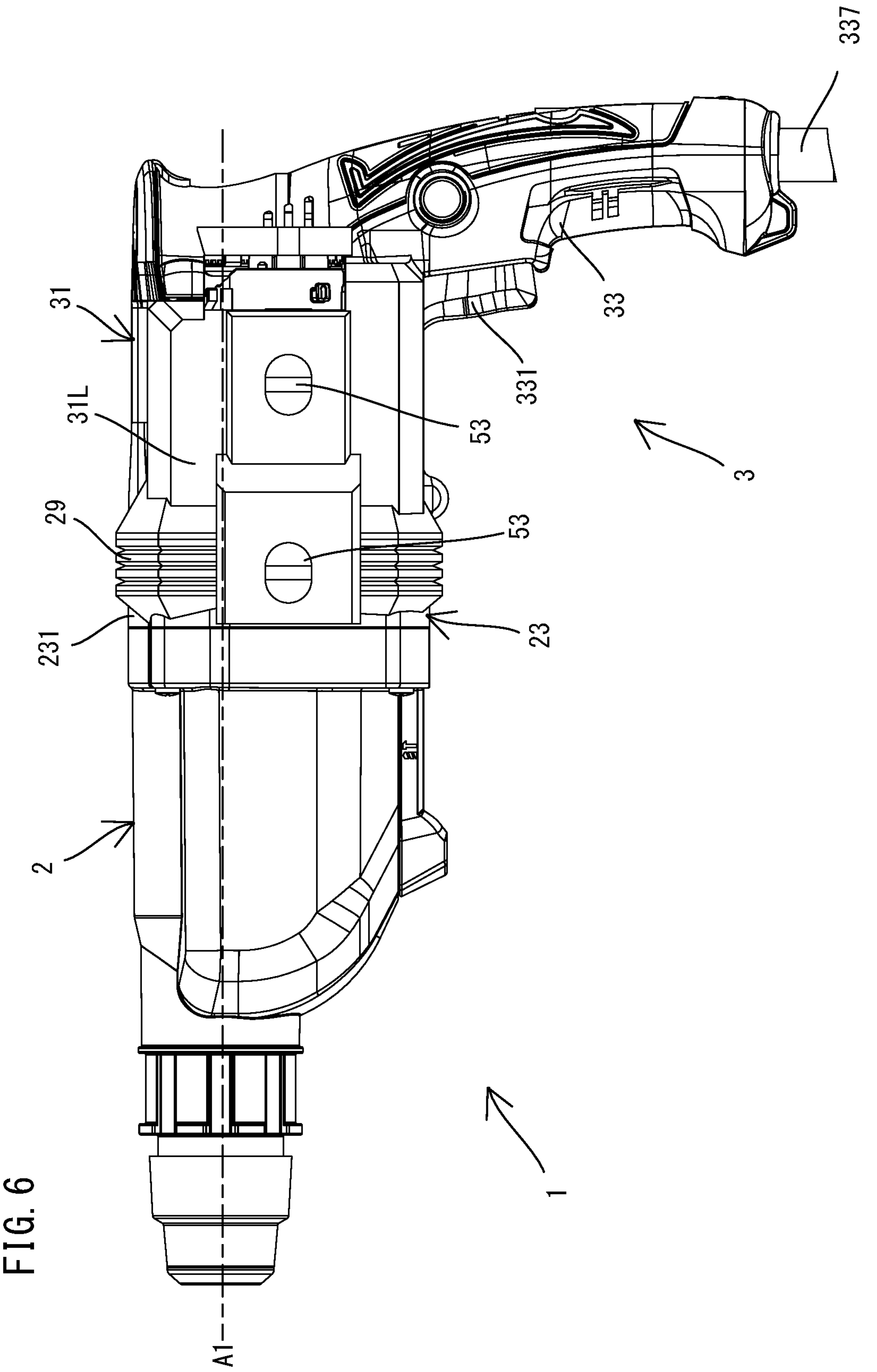
FIG. 6 is a left side view of the rotary hammer in a state in which the handle is at (in) a forward position.
Figure 7:
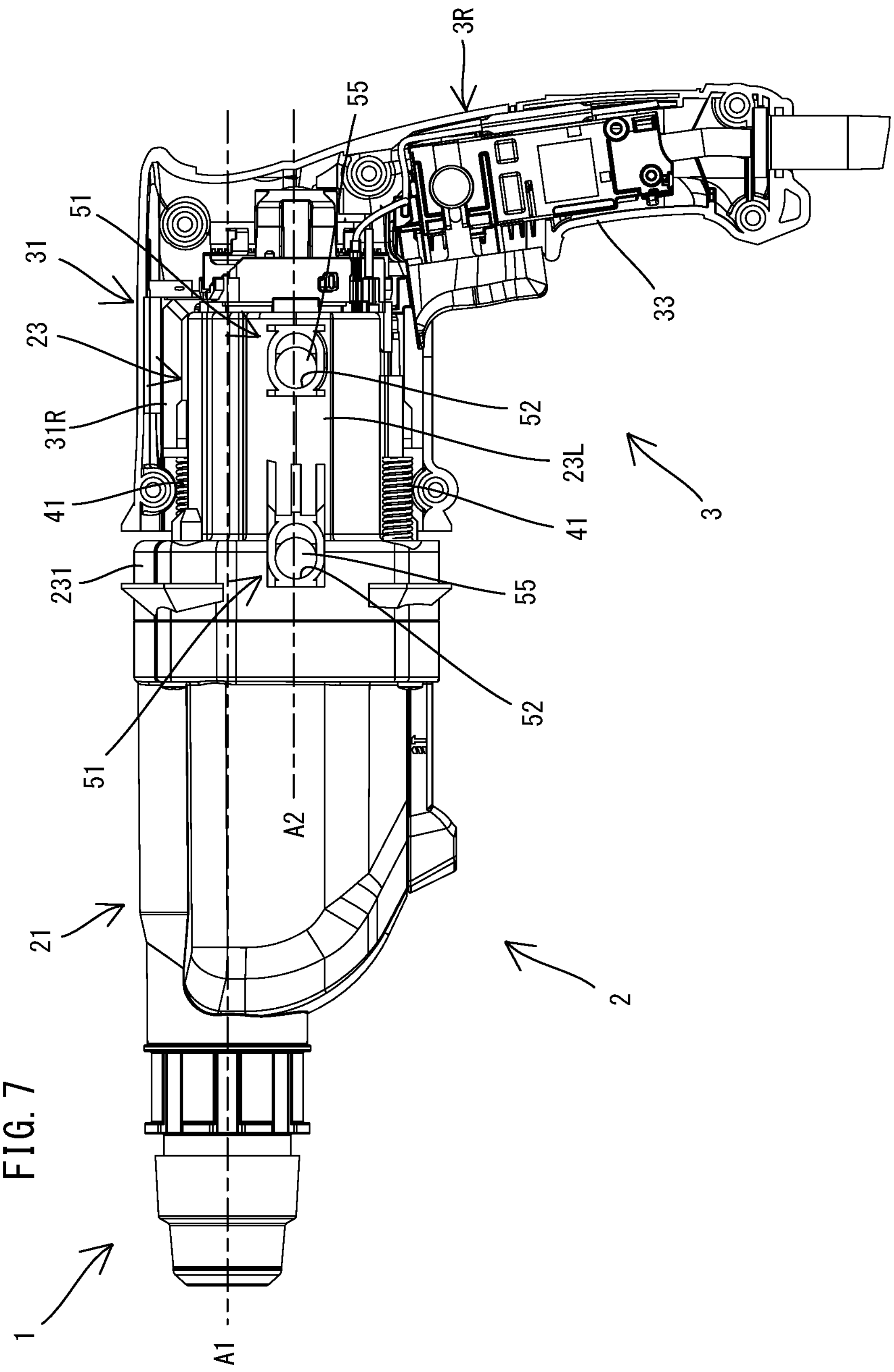
FIG. 7 is a left side view of the rotary hammer in a state in which the left member of the handle is removed and the handle is at the forward position.
Figure 8:
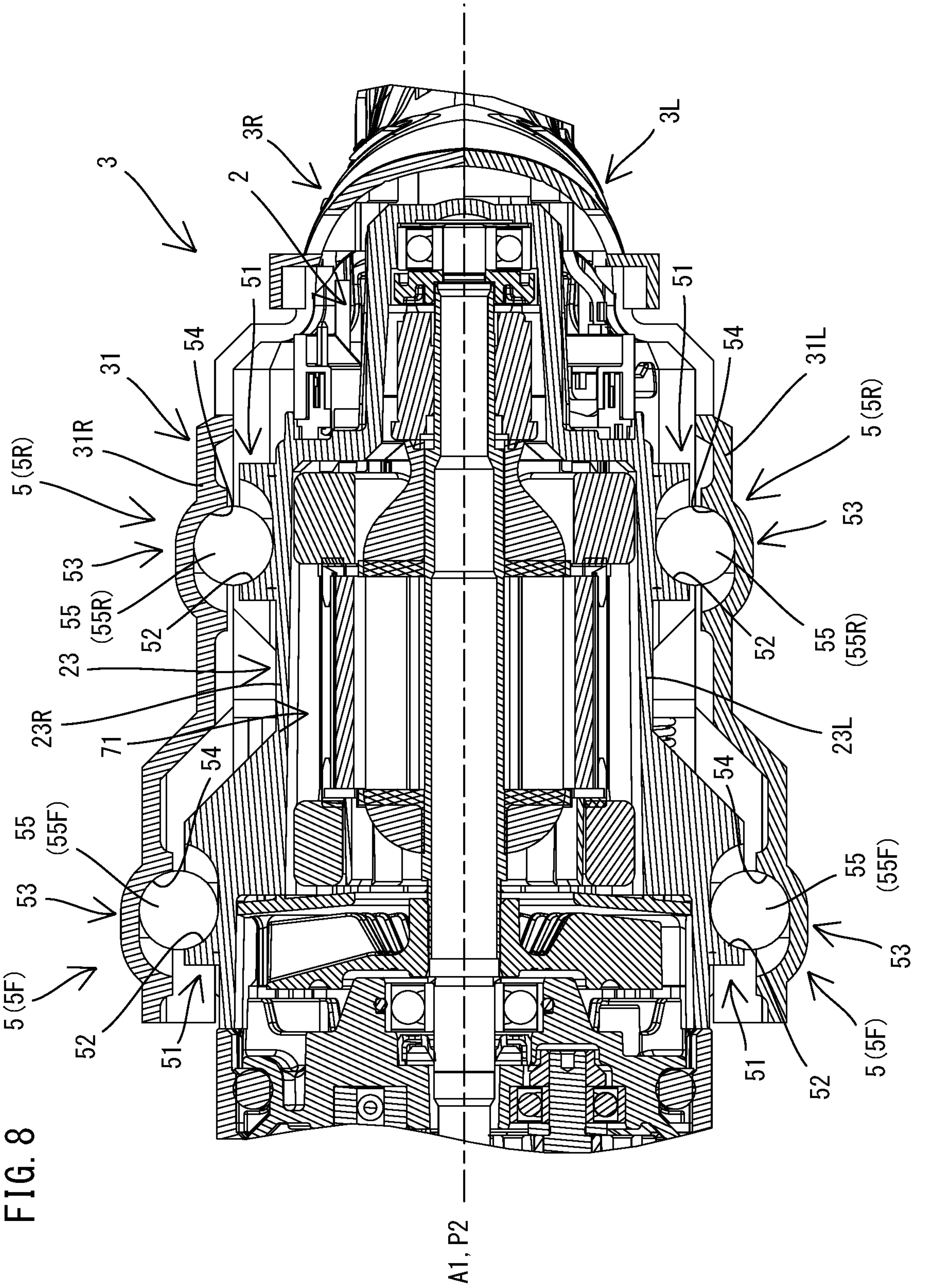
FIG. 8 is a sectional view corresponding to FIG. 4 that shows a state in which the handle is at the forward position.
Figure 9:
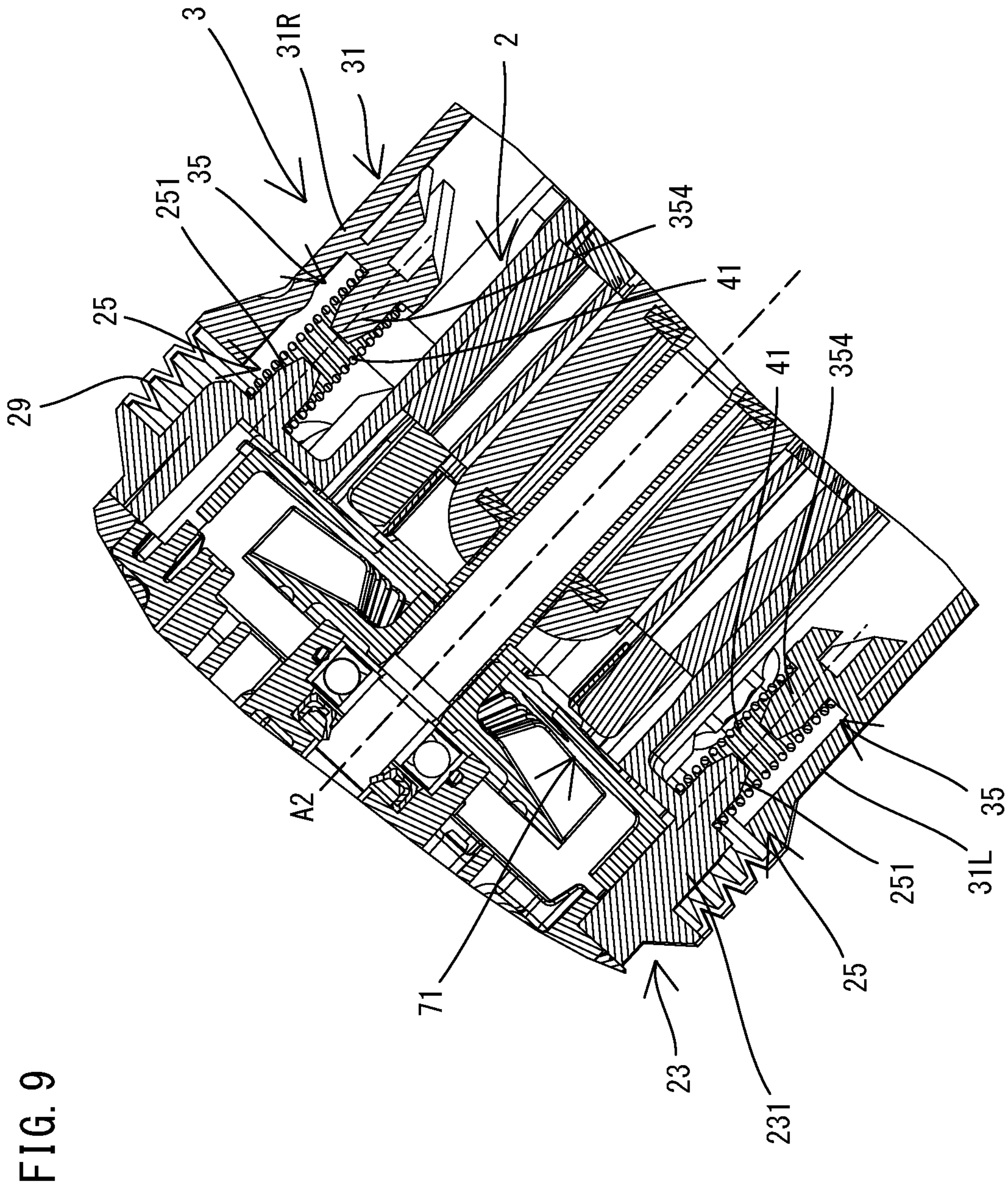
FIG. 9 is a sectional view corresponding to FIG. 5 that shows a state in which the handle is at the forward position.

As shown in FIG. 5, the front portion 231 of the motor housing part 23 of the tool body 2 has the two first spring receiving parts (the spring seats) 25. More specifically, one of the first spring receiving parts 25 is on a lower left rear portion of the front portion 231. The other one of the first spring receives 25 is on a upper right rear portion of the front portion 231. Further more specifically, the two first spring receiving parts 25 are arranged on (along) an imaginary plane P1 (see FIG. 2) that contains the rotational axis A2 of the motor shaft 711 and that extends from a left lower side toward a right upper side as viewed from behind the rotary hammer 1. Thus, the plane P1 intersects the first spring receiving parts 25. The two first spring receiving parts 25 are also arranged in symmetry relative to the rotational axis A2. Thus, the two first spring receiving parts 25 are disposed at different positions in the up-down direction and in the left-right direction, but arranged at substantially the same position in the front-rear direction. The first spring receiving parts 25 are substantially at the same distance from the rotational axis A2.

The biasing member 41 of this embodiment is a compression coil spring having a first end portion 411 and a second end portion 412. Each of the first spring receiving parts 25 is configured to receive (abut on) a first end portion 411 of the biasing member 41. More specifically, each of the first spring receiving parts 25 has a protrusion (projection) 251 that protrudes rearward from a rear end surface of the front portion 231. The first end portion 411 of the biasing member 41 is fitted around the protrusion 251 of the first spring receiving part 25, and abuts on the rear end surface of the front portion 231 (a shoulder portion) of the motor housing part 23. The rear end surface of the front portion 231 thus serves a contact surface 252.

The two second spring receiving parts 35 are arranged to correspond to the two first spring receiving parts 25 of the tool body 2, respectively. More specifically, one of the second spring receiving parts 35 is disposed on (in) a lower left central portion of the cover part 31 and the other one of the second spring receiving parts 35 is disposed on (in) an upper right central portion of the cover part 31. Further more specifically, the two second spring receiving parts 35 are arranged on (along) the plane P1 (see FIG. 2). Thus, the plane P1 intersects the second spring receiving parts 35. The second spring receiving parts 35 are also arranged in symmetry relative to the rotational axis A2. The two second spring receiving parts 35 are arranged directly behind the two first spring receiving parts 25, respectively. Thus, a straight line that passes the first spring receiving part 25 and that is in parallel to the rotational axis A2 of the motor shaft 711 (i.e., that extends in the front-rear direction) also passes through the second spring receiving parts 35.

Each of the second spring receiving parts 35 is configured to receive (abut on) the second end portion 412 of the biasing member 41. More specifically, each of the second spring receiving parts 35 has a base part 351 that protrudes toward an inside of the cover part 31, and a protrusion (projection) 354 that protrudes forward from the base part 351. The second end portion 412 of the biasing member 41 is fitted around the protrusion 354, and abuts on a front end surface of the base part 351. The front end surface of the base part 351 thus serves as a contact surface 352.

In this manner, the first spring receiving parts 25 and the corresponding second spring receiving parts 35 are elastically connected to each other by the biasing members 41, respectively. Each of the biasing members 41 is held between the first spring receiving part 25 and the second spring receiving part 35 in a compressed manner, and thus biases the tool body 2 and the handle 3 away from (to be separated from) each other. Specifically, the biasing members 41 each biases the tool body 2 and the handle 3 forward and rearward, respectively.

The structure for connecting the first ball holding parts 51 and the second ball holding parts 53 is now described.

As shown in FIGS. 3 and 4, a left portion 23L of the motor housing part 23 has two of the four first ball holding parts 51, and a right portion 23R of the motor housing part 23 has the other two of the four first ball holding parts 51. More specifically, the two first ball holding parts 51 are arranged on the left portion 23L to be spaced apart from each other in the front-rear direction. Similarly, the two first ball holding parts 51 are arranged on the right portion 23R to be spaced apart from each other in the front-rear direction. The two first ball holding parts 51 in each of the left portion 23L and the right portion 23R are disposed in a front region and a rear region in the front-rear direction within a portion of the motor housing part 23 that is covered by the cover part 31 of the handle 3. Further, the two first ball holding parts 51 are arranged at substantially the same position in the up-down direction. Thus, the two first ball holding parts 51 are aligned on a straight line extending in the front-rear direction in a side view (when the tool body 2 is viewed from the left or right side). To put it differently, a straight line that extends in the front-rear direction passes through (overlaps) the two first ball holding parts 51 in the side view. In this embodiment, the two first ball holding parts 51 are located on (overlap) the rotational axis A2 of the motor shaft 711 in the side view.

Further, a front pair of left and right first ball holding parts 51, among the four first ball holding parts 51, are arranged in symmetry relative to an imaginary plane P2 (see FIG. 2) that passes the center of the rotary hammer 1 (the tool body 2) in the left-right direction and that extends in the up-down direction (i.e., a substantial extension direction of the grip part 33). The plane P2 is also an imaginary plane that contains the driving axis A1 and that extends in the up-down direction (or an imaginary plane that contains the driving axis A1 and the rotational axis A2). Similarly, a rear pair of left and right first ball holding parts 51 are arranged in symmetry relative to the plane P2.

Each of the first ball holding parts 51 has a first recess (cavity, hollow) 52. The four first recesses 52 have the substantially identical configuration. Specifically, each of the first recesses 52 is recessed rightward or leftward (toward the plane P2) on the left portion 23L or the right portion 23R of the motor housing part 23 and has a depth in the left-right direction. Further, each of the first recesses 52 is elongated in the front-rear direction. The depth in the left-right direction and the width in the up-down direction of each of the first recesses 52 are slightly smaller than the diameter of the elastic member 55. The length in the front-rear direction of each of the first recesses 52 is larger than the diameter of the elastic member 55. The first recess 52 is defined by a curved surface. Although not shown in detail, a cross section of the first recess 52 orthogonal to the driving axis A1 has an arc (generally semi-circular) shape, and substantially coincides with (matches) an approximately half of an outer surface of the elastic member 55. Further, as shown in FIG. 4, each of a front end portion and a rear end portion of the first recess 52 is defined by a curved surface that coincides with (matches) an approximately quarter of the elastic member 55.

Corresponding to the four first ball holding parts 51 of the tool body 2, the left wall part 31L of the cover part 31 has two of the four second ball holding parts 53, and the right wall part 31R of the cover part 31 has the other two of the four second ball holding parts 53. More specifically, the two second ball holding parts 53 are arranged on the left wall part 31L of the cover part 31 to be spaced apart from each other in the front-rear direction. Similarly, the two second ball holding parts 53 are arranged on the right wall part 31R of the cover part 31 to be spaced apart from each other in the front-rear direction. Further, the two second ball holding parts 53 in each of the left wall part 31L and the right wall part 31R are arranged at substantially the same position in the up-down direction. Thus, the two second ball holding parts 53 are aligned on a straight line (more specifically, on the rotational axis A2 of the motor shaft 711) extending in the front-rear direction in a side view (when the handle 3 is viewed from the left or right side). To put it differently, a straight line (the rotational axis A2) that extends in the front-rear direction passes through (overlaps) the two second ball holding parts 53 in the side view.

Further, a front pair of left and right second ball holding parts 53, among the four second ball holding parts 53, are arranged in symmetry relative to the plane P2 (see FIG. 2).

Similarly, a rear pair of left and right second ball holding parts 53 are arranged in symmetry relative to the plane P2.

Each of the second ball holding parts 53 has a second recess (cavity, hollow) 54. The four second recesses 54 have the substantially identical configuration. Specifically, each of the second recesses 54 is recessed leftward or rightward (away from the plane P2) on the left wall part 31L or the right wall part 31R of the cover part 31, and has a depth in the left-right direction. Further, each of the second recesses 54 is elongated in the front-rear direction. Although the first recess 52 and the second recess 54 respectively face opposite sides in the left-right direction, the second recess 54 has substantially the same configuration (the length, width and curved surface) as the first recess 52.

As shown in FIG. 4, the elastic member 55 is disposed between the first ball holding part 51 and the second ball holding part 53 in the left-right direction to elastically connect the first ball holding part 51 and the second ball holding part 53. The elastic member 55 is a spherical body (ball) that is made of rubber for vibration isolation (for example, nitrile butadiene rubber (NBR)). The left portion 23L of the motor housing part 23 and the left wall part 31L of the cover part 31 are held to be spaced apart from each other (i.e., in a non-contact state) in the left-right direction by the elastic members 55. Similarly, the right portion 23R of the motor housing part 23 and the right wall part 31R of the cover part 31 are held to be spaced apart from each other (i.e., in a non-contact state) in the left-right direction by the elastic member 55.

Further, each of the elastic members 55 is movable in the front-rear direction relative to the tool body 2 and the handle 3. More specifically, the elastic member 55 is rollable in the front-rear direction within the first recess 52 and the second recess 54 along the surfaces (the curved surfaces) that respectively define the first recess 52 and the second recess 54. On the other hand, upward/downward rolling movement of the elastic member 55 within the first recess 52 and the second recess 54 is restricted. The elastic member 55 can guide relative movement of the tool body 2 and the handle 3 in the front-rear direction by rolling in the front-rear direction within the first recess 52 and the second recess 54. For this reason, in the following description, the first ball holding part (the first recess 52), the second ball holding part 53 (the second recess 54), and the elastic member 55 may also be collectively referred to as a guide part 5. In this embodiment, the rotary hammer 1 includes a total of four such guide parts 5. Specifically, the left side portion of the rotary hammer 1 has two of the four guide parts 5, while the right side portion of the rotary hammer 1 has the other two guide parts 5.

In the following description, the four guide parts 5 may be simply collectively referred to as the guide parts 5 when they are mentioned without distinction. Similarly, any one of the four guide parts 5 may be simply referred to as the guide part 5 when it is mentioned without distinction. Among the four guide parts 5, either one of the front pair of left and right guide parts 5 may be referred to as a front guide part 5F, and either one of the rear pair of left and right guide parts 5 may be referred to as a rear guide part 5R. Further, the four elastic members 55 may be simply collectively referred to as the elastic members 55, when they are mentioned without distinction. Similarly, any one of the four elastic members 55 may be simply referred to as the elastic member 55, when it is mentioned without distinction. Among the four elastic members 55, either one of the elastic members 55 of the front guide parts 5F may be referred to as a front elastic member 55F. Either one of the elastic members 55 of the rear guide parts 5R may be referred to as a rear elastic member 55R.

In this embodiment, all the four elastic members 55 are made of the same kind of rubber. However, elastic deformation property (elastic deformability, or ease/tendency of elastic deformation) of the front elastic member 55F is different from elastic deformation property of the rear elastic member 55R. More specifically, the front elastic member 55F is less elastically deformable (more difficult to be elastically deformed), compared to the rear elastic member 55R. Specifically, the front elastic members 55F are each made of rubber having higher hardness (i.e., harder) than that of the rubber of the rear elastic member 55R.

As described above, the biasing members 41 bias the tool body 2 and the handle 3 away from each other in the front-rear direction (i.e., forward and rearward, respectively). Therefore, in an initial state, owing to the biasing force of the biasing members 41, the handle 3 is held at (in) a position (a position shown in FIGS. 3 and 4, hereinafter referred to as an initial position) where the elastic member 55 is partially in contact with (fits in) the rear end portion of the first recess 52 and the front end portion of the second recess 54 in each of the guide parts 5. When the handle 3 is at (in) the initial position, the elastic member 55 mainly receives forces in shear directions that are respectively applied from the first ball holding part 51 and the second ball holding part 53 via the surfaces that define the first recess 52 and the second recess 54. The force in the shear direction may include a force in a direction of linear shear and a force in a direction of torsional shear. In this embodiment, the biasing force of the biasing member 41 is set such that the elastic member 55 only slightly undergoes shear deformation in the initial state.

When an external force that causes the tool body 2 and the handle 3 to move closer to each other (for example, a pressing force of the user upon pressing the tool accessory 91 against a workpiece) is applied in the front-rear direction, as shown in FIGS. 6 to 9, the handle 3 moves forward relative to the tool body 2 from the initial position while compressing the biasing members 41 (against the biasing force of the biasing members 41). In response to this relative movement, the rear end portion of each second ball holding part 53 abuts (comes into contact with) the corresponding elastic member 55 from behind, and thus rolls the elastic member 55 forward within the first recess 52. The elastic member 55 rolls without undergoing substantial shear deformation until the handle 3 reaches a position (a position shown in FIGS. 7 and 8, hereinafter referred to as a forward position) where the elastic member 55 partially makes contact with (fits in) the front end portion of the first recess 52 and the rear end portion of the second recess 54. When the handle 3 is at the forward position, the elastic member 55 mainly receives the forces in the shear directions respectively applied from the first ball holding part 51 and the second ball holding part 53. When the tool body 2 and the handle 3 relatively move further closer to each other in the front-rear direction, the elastic member 55 is further subjected to the forces in the shear directions, and thus undergoes shear deformation. The handle 3 can move relative to the tool body 2 to a foremost position, which is further forward of the forward position, in response to the shear deformation of the elastic members 55.

Further, when the tool body 2 and the handle 3 move in the left-right direction, the elastic member 55 mainly receives forces in compression directions respectively applied from the first ball holding part 51 and the second ball holding part 53, and thus the elastic member 55 undergoes compressive deformation.

Further, when the tool body 2 and the handle 3 relatively move in the up-down direction, the elastic member 55 mainly receives the forces in the shear directions respectively applied from the first ball holding part 51 and the second ball holding part 53, and thus the elastic member 55 undergoes shear deformation. At this time, in this embodiment, the handle 3 can substantially pivot relative to the tool body 2 about the left and right front guide parts 5F (specifically, the front elastic members 55F), which serve as a fulcrum (pivot). More specifically, as described above, the front elastic members 55F of the front guide parts 5F are harder and thus can be elastically deformed less easily, compared to the rear elastic members 55R of the rear guide parts 5R. In other words, the rear elastic members 55R can be elastically deformed more easily, compared to the front elastic members 55F. Accordingly, when an external force is applied to cause relative movement of the tool body 2 and the handle 3 in the up-down direction, the handle 3 can substantially pivot relative to the tool body 2 about the left and right front elastic members 55F (i.e., the fulcrum) while causing larger shear deformation of the rear elastic members 55R. This action is also caused when an external force is applied to cause relative pivoting movement of the tool body 2 and the handle 3 around an axis extending in the left-right direction.

The actions of the tool body 2 and the handle 3 during the hammering operation are now described.

When the driving mechanism 75 performs the hammering operation, the tool accessory 91 is driven along the driving axis A1. Consequently, largest vibration is generated on the tool body 2 in the driving-axis direction (i.e., in the front-rear direction). In response to the vibration, the tool body 2 and the handle 3 move relative to each other in the front-rear direction. As described above, when the handle 3 moves relative to the tool body 2 within a specified range between the initial position and the forward position, in each guide part 5, the elastic member 55 rolls in the front-rear direction within the first recess 52 and the second recess 54. At this time, the biasing members 41 extend/contract in response to the relative movement of the tool body 2 and the handle 3, so that vibration transmission to the handle 3 is reduced. Further, when the handle 3 moves relative to the tool body 2 between the forward position and the foremost position, the vibration transmission to the handle 3 is effectively reduced by not only the extension/contraction of the biasing members 41 but also the shear deformation of the elastic members 55. In this manner, in this embodiment, the vibration transmission can be reduced in accordance with the magnitude of the vibration in the front-rear direction, utilizing the extension/contraction of the biasing members 41, the rolling movement of the elastic members 55 and the shear deformation of the elastic members 55.

Further, smooth relative movement of the tool body 2 and the handle 3 in the front-rear direction can be realized by the elastic members 55 respectively rolling in the front-rear direction within the corresponding first recesses 52 and the second recesses 54. In particular, in this embodiment, the rotary hammer 1 includes two pairs of the guide parts 5 (one pair of left and right front guide parts 5F and one pair of left and right rear guide parts 5R) that are spaced apart from each other in the front-rear direction. Therefore, the relative movement of the tool body 2 and the handle 3 in the front-rear direction can be stably guided. Further, since each elastic member 55 has the spherical (ball) shape, the elastic member 55 is not easy to be damaged, even when the forces in the shear directions are applied to the elastic member 55 from the first ball holding part 51 and the second ball holding part 53. Further, since the elastic member 55 is rollable, the elastic member 55 has superior wear resistance.

Further, in this embodiment, each elastic member 55 can elastically deform in response to the relative movement of the tool body 2 and the handle 3 not only in the front-rear direction but also in the direction intersecting the driving axis A1. More specifically, the elastic member 55 undergoes shear deformation in response to the relative movement of the tool body 2 and the handle 3 in the up-down direction, and undergoes compressive deformation in response to the relative movement of the tool body 2 and the handle 3 in the left-right direction. Although not as large as the vibration in the front-rear direction, vibration is also caused on the tool body 2 in other direction(s) (for example, in the up-down direction and/or in the left-right direction) during the hammering operation. The connecting structure including the elastic members 55 in this embodiment can also appropriately cope with the vibration in all directions other than the front-rear direction, utilizing the elastic deformation (the shear deformation and/or the compressive deformation) of the elastic members 55.

In an embodiment in which the driving mechanism 75 employs a motion converting mechanism including an oscillating member (for example, a swash bearing, a wobble plate/bearing, etc.), vibration is generated in the up-down direction. Although not as large as the vibration in the front-rear direction, the vibration in the up-down direction is larger than that in the left-right direction. The rubber for vibration isolation has relatively low shear stiffness, compared to its compression stiffness. Thus, the elastic member 55 has a property that the shear deformation of the elastic member 55 can more effectively reduce vibration transmission than the compression deformation. This embodiment effectively utilizes this property by employing the structure that causes the shear deformation of the elastic member 55 in response to the relative movement of the tool body 2 and the handle 3 in the front-rear direction and in the up-down direction, and that causes compressive deformation of the elastic member 55 in response to the relative movement of the tool body 2 and the handle 3 in the left-right direction.

Further, in this embodiment, owing to the setting of the elastic deformation properties of the elastic members 55 as described above, the front elastic members 55F of the front guide parts 5F serve as the fulcrum of the relative pivoting movement of the tool body 2 and the handle 3. This configuration can also appropriately cope with the vibration in the direction of the relative pivoting movement. The front guide parts 5F are located farther from the grip part 33 than the rear guide parts 5R. In particular, in this embodiment, the first ball holding parts 51 (the first recesses 52) and the second ball holding parts 53 (the second recesses 54) of the front guide parts 5F are disposed at the foremost positions on/in overlapping portions of the motor housing part 23 and the cover part 31, respectively. This arrangement can effectively reduce transmission, to the grip part 33, of the vibration in the direction of the relative pivoting movement of the tool body 2 and the handle 3.

Further, in this embodiment, the tool body 2 and the handle 3 are biased by the two biasing members 41. Thus, the tool body 2 and the handle 3 can move relative to each other more stably, compared to a structure having only one biasing member 41. In particular, the two biasing members 41 are arranged in symmetry relative to the rotational axis A2 of the motor shaft 711 and arranged at different positions in the up-down direction and the left-right direction. This arrangement of the biasing members 41 can suppress unfavorable tilting of the handle 3 in the up-down direction or in the left-right direction during the relative movement of the handle 3 and the tool body 2 in the front-rear direction.

Correspondences between the features of the above-described embodiment and the features of the present disclosure are as follows. However, the features of the embodiment are merely exemplary, and do not limit the features of the present disclosure or the present invention.

The rotary hammer 1 is an example of the "power tool having a hammer mechanism". The driving axis A1 is an example of the "driving axis". The tool accessory 91 is an example of the "tool accessory". The tool body 2 is an example of the "tool body". The motor 71 is an example of the "motor". The handle 3 is an example of the "handle". The cover part 31 is an example of the "cover part". The grip part 33 is an example of the "grip part". The biasing member 41 is an example of the "biasing member". The elastic member 55 is an example of the "elastic member". The front elastic member 55F is an example of the "front elastic member". The rear elastic member 55R is an example of the "rear elastic member". The motor shaft 711 is an example of the "output shaft of the motor".

<Modifications>

The above-described embodiment is merely an exemplary embodiment of the disclosure, and the power tool having the hammer mechanism according to the present disclosure is not limited to the rotary hammer 1 of the above-described embodiment. For example, the following non-limiting modifications may be made. Further, at least one of these modifications may be employed in combination with at least one of the rotary hammer 1 of the above-described embodiments and the claimed features.

In the above-described embodiment, the rotary hammer 1 is exemplarily described as a power tool having a hammer mechanism. However, the feature(s) of the present disclosure may be applied to other power tool that are capable of performing the hammering operation (for example, an electric hammer that performs only the hammering operation without performing the rotary operation). Further, the rotary hammer 1 may have only two action modes of (i) the hammer mode and (ii) the rotary mode. The structures of the tool body 2 and the handle 3 and the structures and arrangements of the motor 71 and the driving mechanism 75 may be appropriately changed, depending on the power tool to which the features of the present disclosure are applied.

For example, the tool body 2 may be formed by connecting the driving-mechanism housing part 21 and the motor housing part 23 to form an L-shape in the side view. Further, the motor 71 may be arranged such that the rotational axis A2 of the motor shaft 711 intersects the driving axis A1. In such a modification, the shape of the handle 3 may also be appropriately changed. For example, the handle 3 may include (i) a first cover part that partially covers the driving-mechanism housing part 21, (ii) a second cover part that partially covers the motor housing part 23, and (iii) a grip part having two end portions respectively connected to the first cover part and the second cover part. Further, in the above-described embodiment, the handle 3 is formed by two halves (the left member 3L and the right member 3R) connected to each other in the left-right direction. However, the handle 3 may be formed by connecting two halves that are divided, for example, in the front-rear direction. Alternatively, the handle 3 may be formed by connecting a plurality of components divided in other direction.

For example, a DC motor (for example, a brushless DC motor) may be employed as the motor 71. In this modification, for example, a battery mount, which is configured to removably receive a rechargeable battery (a battery pack), may be disposed on (in) the tool body 2 or the handle 3.

The structure for connecting the tool body 2 and the handle 3 may be appropriately changed. The modifications relating to the structure for connecting the tool body 2 and the handle 3 are now described.

For example, a biasing member that biases the tool body 2 and the handle 3 away from each other in the front-rear direction is not limited to the biasing member 41. For example, a spring (for example, a tension coil spring, a flat spring, a torsion spring, etc.) other than the compression coil spring may be employed. Alternatively, an elastic member such as rubber or synthetic resin (polymeric material) other than a spring may be employed. The number and positions of the biasing members 41 are not limited to those in the above-described embodiment. For example, only one biasing member 41 may be disposed on (along) the plane P2. Alternatively, three or more biasing members 41 may be employed. Further, the structures of the first spring receiving part 25 and the second spring receiving part 35 that receive the ends of the biasing member 41 may be appropriately changed in accordance with the kind, position or the like of the biasing member to be employed.

The structure for guiding the relative movement of the tool body 2 and the handle 3 in the front-rear direction is not limited to the guide part 5 (the first ball holding part 51, the second ball holding part 53 and the elastic member 55).

For example, the configuration (the kind, shape, etc.) of the elastic member 55 may be appropriately changed. For example, the elastic member 55 may be made of elastically deformable (shear-deformable, compression-deformable) synthetic resin (polymeric material), instead of rubber. Further, the elastic member 55 may have a different shape (for example, a circular cylindrical shape (pin), an oval cylindrical shape, a rectangular cylindrical shape, a hollow cylindrical shape, etc.), instead of the spherical shape (ball). The configurations of the first recess 52 and the second recess 54 may be appropriately changed in accordance with the change of the elastic member 55. For example, each of the first recess 52 and the second recess 54 may be an opening (a through hole) that penetrates a wall part of the motor housing part 23, instead of the bottomed recess. The elastic member having a shape other than the spherical shape (ball) may be slidable relative to the first ball holding part 51 and the second ball holding part 53 and shear-deformable in response to the relative movement of the tool body 2 and the handle 3.

The elastic deformation property (elastic deformability, or ease/tendency of elastic deformation) of the front elastic member 55F of the front guide part 5F and the elastic deformation property of the rear elastic member 55R of the rear guide part 5R may be made different from each other by a difference of their materials or their shapes. For example, the front elastic member 55F and the rear elastic member 55R may have the same shapes but made of different elastic materials. Alternatively, the front elastic member 55F and the rear elastic member 55R may be made of the same elastic material, but have different shapes so that the ease of elastic deformation thereof are different due to their different shapes. Further alternatively, the elastic deformation property of the front elastic member 55F may be the same as the elastic deformation property of the rear elastic member 55R.

The arrangement of the guide parts 5 is not limited to that in the above-described embodiment. For example, in the above-described embodiment, the two guide parts 5 provided to each of the left portion and the right portion of the rotary hammer 1 are aligned on the straight line extending in the front-rear direction (i.e., located at the same position in the up-down direction). Instead, the two guide parts 5 may be arranged at different positions in the up-down direction. Further, the two guide parts 5 may be arranged on a straight line extending in the front-rear direction below or above the rotational axis A2 of the motor shaft 711 in the side view. The positions of the two guide parts 5 may be appropriately changed within a region where the tool body 2 (the motor housing part 23) and the handle 3 (the cover part 31) overlap with each other. However, it is still preferable that the two guide parts 5 are spaced apart from each other as much as possible in the front-rear direction within the region.

The number of the guide parts 5 is not limited to the above-described example (four), and it is sufficient that the rotary hammer 1 has at least one guide part 5. For example, the rotary hammer 1 may have only one pair of left and right guide parts 5 (for example, the pair of front guide parts 5F). Alternatively, the rotary hammer 1 may have only two guide parts 5 spaced apart from each other in the front-rear direction (for example, the two guide parts 5 in the left side portion).

Further, in view of the nature of the present disclosure, the following Aspects can be provided. At least one of the following Aspects can be employed in combination with at least one of the above-described embodiment, the above-described modifications and the claimed features.

(Aspect 1)

A direction that is orthogonal to the front-rear direction and that corresponds to an extension direction of the grip part defines an up-down direction of the power tool, a direction that is orthogonal to the front-rear direction and the up-down direction defines a left-right direction of the power tool, and the at least one elastic member is disposed between a side portion of the tool body and the cover part of the handle in the left-right direction.

(Aspect 2)

The tool body has at least one first recess that extends in the front-rear direction, the cover part of the handle has at least one second recess that extends in the front-rear direction, and the at least one elastic member is held to be partially in contact with a first surface that defines the at least one first recess and with a second surface that defines the at least one second recess.

The first recess 52 and the second recess 54 are examples of the "first recess" and the "second recess", respectively.

(Aspect 3)

The at least one elastic member is configured to undergo shear deformation in response to being pressed by a front end portion of the first recess and a rear end portion of the second recess when the tool body and the handle relatively move to be closer to each other in the front-rear direction beyond the specified range, and the at least one elastic member is configured to undergo shear deformation in response to being pressed by a rear end portion of the first recess and a front end portion of the second recess when the tool body and the handle relatively move away from each other beyond the specified range.

(Aspect 4)

The specified range is defined by a first position and a second position between which the handle moves relative to the tool body, when the handle is placed at the first position, the at least one elastic member comes into contact with the rear end portion of the first recess and the front end portion of the second recess, and when the handle is placed at the second position, the at least one elastic member comes into contact with the front end portion of the first recess and the rear end portion of the second recess.

(Aspect 5)

The at least one elastic member is shorter than the first recess and the second recess in the front-rear direction.

(Aspect 6)

A direction that is orthogonal to the front-rear direction and that corresponds to an extension direction of the grip part defines an up-down direction of the power tool, a direction that is orthogonal to the front-rear direction and the up-down direction defines a left-right direction of the power tool, and the at least one elastic member is compression-deformable in the left-right direction.

(Aspect 7)

The at least one elastic member is made of rubber.

(Aspect 8)

The at least one biasing member is at least one spring.

(Aspect 9)

The motor has an output shaft that is rotatable around an axis parallel to the driving axis, the cover part has a tubular shape at least in part and is configured to cover a portion of the tool body, and one end of the grip part is connected to the cover part and the other end of the grip part is a free end.

DESCRIPTION OF THE REFERENCE NUMERALS

1: rotary hammer, 2: tool body, 21: driving-mechanism housing part, 23: motor housing part, 23L: left portion, 23R: right portion, 231: front portion, 25: first spring receiving part, 251: protrusion, 252: contact surface, 29: bellows part, 3: handle, 3L: left member, 3R: right member, 31: cover part, 31L: left wall part, 31R: right wall part, 33: grip part, 331: trigger, 335: switch, 337: power cord, 35: second spring receiving part, 351: base part, 352: contact surface, 354: protrusion, 41: biasing member, 411: first end portion, 412: second end portion, 5: guide part, 5F: front guide part, 5R: rear guide part, 51: first ball holding part, 52: first recess, 53: second ball holding part, 54: second recess, 55: elastic member, 55F: front elastic member, 55R: rear elastic member, 71: motor, 711: motor shaft, 713: fan, 75: driving mechanism, 79: tool holder, 91: tool accessory, A1: driving axis, A2: rotational axis

What is claimed is:

1. A power tool having a hammer mechanism configured to linearly drive a tool accessory along a driving axis defining a front-rear direction, the power tool comprising:

a tool body extending along the driving axis;

a motor housed in the tool body;

a handle (i) connected to the tool body to be movable in at least the front-rear direction relative to the tool body and (ii) including a cover part and a grip part, the cover part covering a portion of the tool body, the grip part being connected to the cover part and extending in a direction intersecting the driving axis;

at least one biasing member (i) between the tool body and the handle and (ii) configured to bias the tool body and the handle away from each other in the front-rear direction; and at least one elastic member operatively between the tool body and the cover part of the handle such that an entirety of the at least one elastic member is movable relative to the tool body and the handle in the front-rear direction when the handle moves relative to the tool body in the front-rear direction, without deformation of the at least one elastic member in the front-rear direction, and is shear-deformable in response to a relative movement of the tool body and the handle, wherein the at least one elastic member, the tool body and the cover part are configured such that:

when the handle moves relative to the tool body in the front-rear direction in specified range, the at least one elastic member is not subject to deformation due to shear forces; and when the handle moves relative to the tool body in the front-rear direction beyond the specified range, the at least one elastic member is subject to deformation due to shear forces.

2. The power tool as defined in claim 1, wherein the at least one elastic member has a spherical shape.

3. The power tool as defined in claim 2, wherein the at least one elastic member is rollable in the front-rear direction relative to the tool body and the handle when the handle moves relative to the tool body in the front-rear direction.

4. The power tool as defined in claim 1, wherein the at least one elastic member is shear-deformable in response to relative movement of the tool body and the handle in an up-down direction that is orthogonal to the front-rear direction and that is an extension direction of the grip part.

5. The power tool as defined in claim 1, wherein the at least one elastic member includes two elastic members that are in symmetry relative to a plane containing the driving axis and extending in an extension direction of the grip part.

6. The power tool as defined in claim 1, wherein the at least one elastic member includes at least one front elastic member and at least one rear elastic member that is closer to the grip part than the at least one front elastic member in the front-rear direction.

7. The power tool as defined in claim 6, wherein an elastic deformation property of the at least one front elastic member is different from an elastic deformation property of the at least one rear elastic member.

8. The power tool as defined in claim 7, wherein the at least one front elastic member is configured to be less deformable than the at least one rear elastic member.

9. The power tool as defined in claim 1, wherein the at least one biasing member includes two biasing members that are on a plane containing an axis of an output shaft of the motor and that are in symmetry relative to the axis.

10. The power tool as defined in claim 1, wherein:

the tool body has at least one first recess extending in the front-rear direction, the cover part of the handle has at least one second recess extending in the front-rear direction, and the at least one elastic member is movable in the front-rear direction in a state in which the at least one elastic member is partially in the at least one first recess and partially in the at least one second recess.

11. The power tool as defined in claim 10, wherein:

the at least one elastic member has a spherical shape, and the at least one elastic member is rollable in the front-rear direction in the state in which the at least one elastic member is partially in the at least one first recess and partially in the at least one second recess.

12. The power tool as defined in claim 11, wherein:

the handle is biased rearward by the at least one biasing member relative to the tool body and normally held at an initial position, the at least one elastic member, the handle and the tool body are configured such that the at least one elastic member rolls without undergoing shear deformation while the handle moves forward relative to the tool body from the initial position to a contact position where the at least one elastic member comes into contact with a front end portion of the first recess and a rear end portion of the second recess, and the at least one elastic member undergoes shear deformation when the handle moves further forward relative to the tool body beyond the contact position.

13. The power tool as defined in claim 12, wherein the at least one elastic member is shear-deformable in response to relative movement of the tool body and the handle in an up-down direction that is orthogonal to the front-rear direction and is an extension direction of the grip part.

14. The power tool as defined in claim 13, wherein:

the at least one elastic member includes at least one front elastic member and at least one rear elastic member that is closer to the grip part than the at least one front elastic member in the front-rear direction, and the at least one front elastic member is configured to be less deformable than the at least one rear elastic member.

15. The power tool as defined in claim 14, wherein:

the at least one front elastic member includes two front elastic members that are in symmetry relative to a plane containing the driving axis and extending in an extension direction of the grip part, and the at least one rear elastic member includes two rear elastic members that are in symmetry relative to a plane containing the driving axis and extending in an extension direction of the grip part.

16. The power tool as defined in claim 15, wherein the at least one biasing member includes two biasing members that are (i) on a plane containing an axis of an output shaft of the motor and in symmetry relative to the axis.

17. A power tool having a hammer mechanism configured to linearly drive a tool accessory along a driving axis defining a front-rear direction, the power tool comprising:

a tool body extending along the driving axis;

a motor housed in the tool body;

a handle (i) connected to the tool body to be movable in at least the front-rear direction relative to the tool body and (ii) including a cover part and a grip part, the cover part covering a portion of the tool body, the grip part being connected to the cover part and extending in a direction intersecting the driving axis;

at least one biasing member (i) between the tool body and the handle and (ii) configured to bias the tool body and the handle away from each other in the front-rear direction; and at least one elastic member operatively between the tool body and the cover part of the handle such that an entirety of the at least one elastic member is movable relative to the tool body and the handle in the front-rear direction when the handle moves relative to the tool body in the front-rear direction, without deformation of the at least one elastic member in the front-rear direction, and is shear-deformable in response to a relative movement of the tool body and the handle, wherein:

the at least one elastic member includes at least one front elastic member and at least one rear elastic member that is closer to the grip part than the at least one front elastic member in the front-rear direction; and an elastic deformation property of the at least one front elastic member is different from an elastic deformation property of the at least one rear elastic member.

18. The power tool as defined in claim 17, wherein the at least one front elastic member is configured to be less deformable than the at least one rear elastic member.

19. A power tool having a hammer mechanism configured to linearly drive a tool accessory along a driving axis defining a front-rear direction, the power tool comprising:

a tool body extending along the driving axis;

a motor housed in the tool body;

a handle (i) connected to the tool body to be movable in at least the front-rear direction relative to the tool body and (ii) including a cover part and a grip part, the cover part covering a portion of the tool body, the grip part being connected to the cover part and extending in a direction intersecting the driving axis;

at least one biasing member (i) between the tool body and the handle and (ii) configured to bias the tool body and the handle away from each other in the front-rear direction; and at least one elastic member operatively between the tool body and the cover part of the handle such that an entirety of the at least one elastic member is movable relative to the tool body and the handle in the front-rear direction when the handle moves relative to the tool body in the front-rear direction, without deformation of the at least one elastic member in the front-rear direction, and is shear-deformable in response to a relative movement of the tool body and the handle, wherein:

the tool body has at least one first recess extending in the front-rear direction;

the cover part of the handle has at least one second recess extending in the front-rear direction;

the at least one elastic member is movable in the front-rear direction in a state in which the at least one elastic member is partially in the at least one first recess and partially in the at least one second recess; and each of a first length of the at least one first recess in the front-rear direction and a second length of the at least one second recess in the front-rear direction is longer than a length of the at least one elastic member in the front-rear direction.

20. The power tool as defined in claim 19, wherein:

the at least one elastic member has a spherical shape, and the at least one elastic member is rollable in the front-rear direction in the state in which the at least one elastic member is partially in the at least one first recess and partially in the at least one second recess.

* * * * *